US007910009B1

(12) United States Patent
Rittmann et al.

(10) Patent No.: US 7,910,009 B1
(45) Date of Patent: *Mar. 22, 2011

(54) APPARATUS AND METHODS FOR WATER TREATMENT

(75) Inventors: Bruce E. Rittmann, Evanston, IL (US); Robert Nerenberg, South Bend, IN (US); César I. Torres, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,642

(22) Filed: Dec. 15, 2009

Related U.S. Application Data

(63) Continuation of application No. 12/025,953, filed on Feb. 5, 2008, now Pat. No. 7,632,415, which is a continuation of application No. 10/876,745, filed on Jun. 25, 2004, now Pat. No. 7,338,597.

(51) Int. Cl.
*B01D 37/00* (2006.01)
(52) U.S. Cl. .................................. 210/767; 210/500.23
(58) Field of Classification Search .................. 210/767, 210/500.23
See application file for complete search history.

(56) References Cited

U.S. PATENT DOCUMENTS

| | | | |
|---|---|---|---|
| 5,332,498 A | 7/1994 | Rogut | |
| 5,395,525 A | 3/1995 | Takano et al. | |
| 5,695,634 A | 12/1997 | Neuenfeldt et al. | |
| 5,796,799 A | 8/1998 | Kobayashi et al. | |
| 6,350,385 B1 | 2/2002 | Holt et al. | |
| 6,767,464 B2 | 7/2004 | Boyd et al. | |
| 6,800,207 B2 | 10/2004 | Holt et al. | |
| 6,852,236 B2 | 2/2005 | Holt et al. | |
| 7,122,115 B2 | 10/2006 | Holt et al. | |
| 7,632,415 B1 * | 12/2009 | Rittmann et al. | 210/767 |
| 2005/0148748 A1 | 7/2005 | Tanaka et al. | |
| 2006/0144777 A1 | 7/2006 | Kumano et al. | |

OTHER PUBLICATIONS

Cowman, J; Torres, C; and Rittmann, B; Total Nitrogen Removal in an Aerobic and Anoxic Membrane Biofilm Reactor System; Environmental Engineering and Science Program, Northwestern University, Evanston, Illinois, Apr. 27, 2004.

Rittmann, B; Nerenberg, R; Stinson, B; Katehis, D; Leong, E; and Anderson, J; Hydrogen-Based Membrane Biolfilm Reactor for Wastewater Treatment; Northwestern University, Departmnt of Civil and Environmental Engineering, Evanston, Illinois.

Nerenberg, R; Rittmann, B; Gillogly, T; Lehman, GE; and Adham, SS; Perchlorate Reduction Using a Hollow-Fiber Membrane Biofilm Reactor: Kinetics, Microbial Ecology, and Pilot-Scale Studies; Northwestern University, Evanston, Illinois.

Nerenberg, R; Rittmann, B; and Najm, I; Perchlorate Reduction in a Hydrogen-Based Membrane-Biofilm Reactor; Journal AWWA, 94:11, Nov. 2002.

Lee, KC; and Rittmann, B; Applying a novel autohydrogenotrophic hollow-fiber membrane biofilm reactor for denitrification of drinking water; Water Research 36, 2002, 2040-2052.

(Continued)

*Primary Examiner* — Chester T Barry
(74) *Attorney, Agent, or Firm* — Reinhart Boerner Van Deuren s.c.

(57) ABSTRACT

An apparatus and method for treatment of water borne oxidized contaminants, using hydrogen as an electron donor for denitrification and reduction of other oxidized contaminants. Preliminary results reported here show that a biofilm of autotrophic denitrifiers accumulates rapidly in the wastewater setting, the MBfR can drive $NO_3^-$ concentrations below 1 mgN/L, and the $H_2$ pressure controls the $NO_3^-$ flux.

20 Claims, 5 Drawing Sheets

OTHER PUBLICATIONS

Lee, KC; and Rittmann, B; Effects of pH and precipitation on autohydrogenotrophic denitrification using the hollow-fiber membrane-biofilm reactor; Water Research 37, 2003, 1551-1556.

Lee, KC; and Rittmann, B; A novel hollow-fibre membrane biofilm reactor for autohydrogenotrophic denitrification of drinking water; Water Science and Technology, vol. 41, No. 4-5, 219-226, 2000.

* cited by examiner

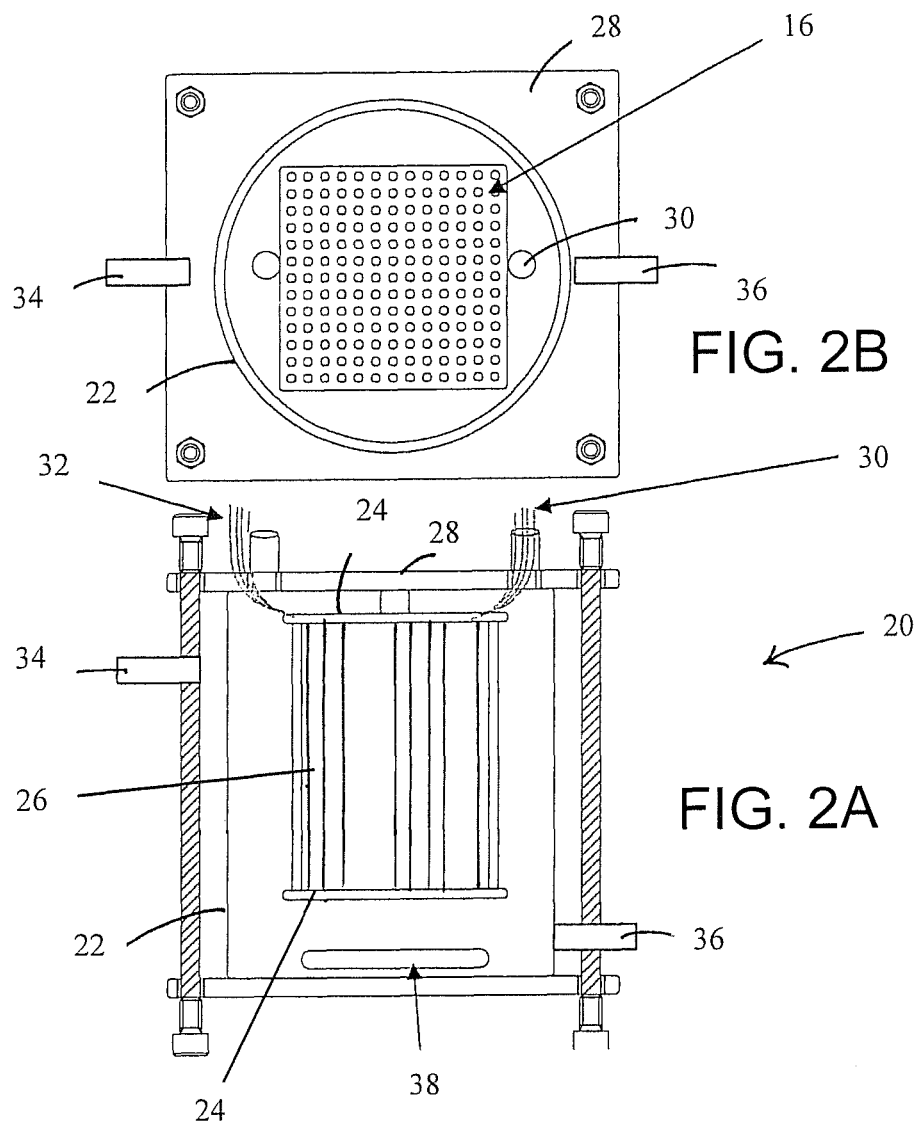
FIG. 2B
FIG. 2A
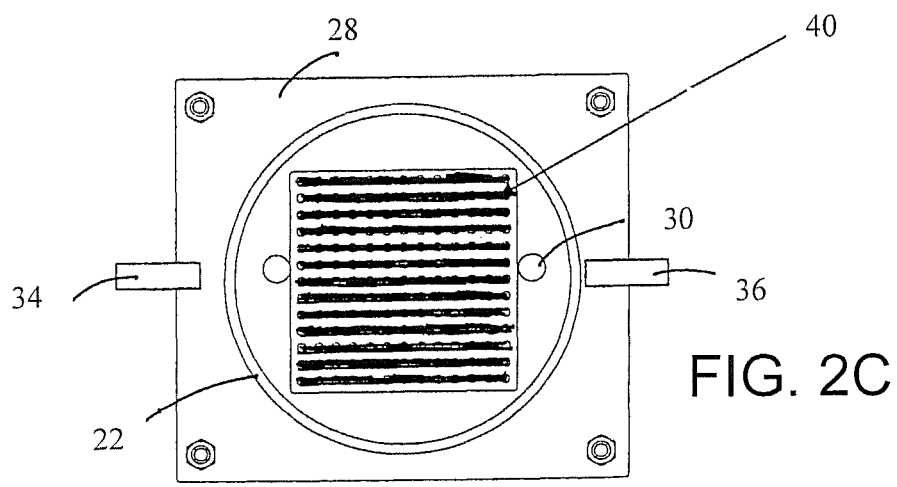
FIG. 2C

APPARATUS AND METHODS FOR WATER TREATMENT

This application is a continuation of and claims priority benefit from application Ser. No. 12/025,953 filed Feb. 5, 2008 and issued as U.S. Pat. No. 7,632,415 on Dec. 15, 2009 which is a continuation of and claims priority benefit from application Ser. No. 10/876,745 filed on Jun. 25, 2004, now U.S. Pat. No. 7,338,597 each of which is incorporated herein by reference in its entirety.

BACKGROUND OF THE INVENTION

Wastewater denitrification protects water resources from nutrient enrichment and accelerated eutrophication. Problems associated with eutrophication include excessive algae growth, turbidity, foul taste and odors, accelerated sedimentation, pathogen growth and hypoxia. Such issues are exacerbated when the wastewater is discharged into a lake, reservoir, estuary or delta, but most pronounced when the discharge is a large portion of a stream or river flow. As a result, the regulation of nitrogenous wastes is bound to become more stringent in the near future. Reliable and cost-effective means to reduce nitrogen concentrations to increasingly lower levels are needed. In response, biological denitrification—bacterial conversion of oxidized nitrogen contaminants to harmless nitrogen gas—has received some attention in the art.

One such approach is described in U.S. Pat. No. 6,307,262, the entirety of which is incorporated herein by reference. A hollow-fiber membrane biofilm reactor (MBfR) introduces hydrogen gas as an electron donor to induce growth of hydrogen-oxidizing bacteria on the membrane's surface. Such bacteria, in turn, reduce oxidized nitrogen contaminants to nitrogen gas. Hydrogen is an efficient and cost-effective reagent that avoids the toxicity and material-handling problems associated with organic electron donors of the prior art. The MBfR alleviates many prior concerns associated with hydrogen, including low solubility and high flammability. Hydrogen diffuses from lumen of the fibers toward the aqueous medium, promoting biofilm growth. Use of a hydrophobic construction material permits the membrane pores to remain dry. No hydrogen bubbles are formed, and little or no hydrogen is carried out but through the treated water, minimizing additional oxygen demand.

Even so, the MBfR technology embodied in the '262 patent does not always provide a complete solution to wastewater treatment. For instance, the hollow fiber membranes are confined to a tubular configuration and require, by design, movement of the aqueous contaminants along the longitudinal fiber axes. One or more water pumps are needed for recirculation and continuous reaction. The tubular configuration does not lend itself to existing wastewater treatment basins, and the fiber density impedes movement of solids through and out of the reactor.

One of the emerging challenges for wastewater treatment is achieving very low effluent concentrations of total nitrogen (TN) and total phosphorus (TP). Increasingly severe problems with eutrophication and hypoxia in lakes, reservoirs, estuaries, and the near-shore ocean are forcing environmental regulators to impose more stringent effluent requirements on TN and TP. For example, an effluent standard for TN could be 1 mgN/L when the discharge is to a sensitive water body; it is possible that a receiving-water standard of 0.12 mgN/L could be applied if the wastewater were the dominant water input. Existing wastewater-treatment technology is capable of taking effluent TN down to the range of 10-15 mg/L, but it is neither reliable nor cost-effective for achieving $\leqq 1$ mgN/L. A key for taking TN down to the 1-mg/L level is stable denitrification to drive $NO_3^-$—N to a few tenths of a mg/L. Stable nitrification can drive $NH_4^+$—N to a few tenths of a mg/L, and filtration can bring organic N to almost zero. If soluble organic nitrogen can be held to a few tenths of a mg/L, total N could be reduced to about 1 mg/L: e.g., 0.2 mg/L $NH_4^+$—N and 0.3 mg/L $NO_3^-$—N totaling 0.5 mg/L soluble organic N.

Pre-denitrification can utilize influent biological oxygen demand (BOD) to fuel denitrification, but realistic constraints on the mixed-liquor recycle rate limit it to about 75% N removal, which leaves about 10 mg/L TN in the effluent when the influent is 40 mgN/L. Furthermore, a high influent TKN:BOD ratio can foil the pre-denitrification strategy as a means for total N removal. Return of digester supernatants is a common situation leading to a high influent TKN:BOD ratio.

Tertiary denitrification using an organic electron donor, such as methanol or acetate, could, in principle, drive effluent $NO_3^-$ to a few tenths of a mgN/L. However, the dosing of the organic donor cannot be controlled well enough to ensure full $NO_3^-$ removal without massive donor overdosing that increases effluent BOD and wastes money. In addition, tertiary denitrification using an organic donor significantly increases excess sludge production and often involves special chemical handling. For example, methanol ($CH_3OH$) is popular for its relatively low cost, but methanol is a dangerous chemical that is toxic to humans, is regulated, has very difficult handling properties, and is oxidized only by specialized methanotrophs.

DETAILED DESCRIPTION OF THE DRAWINGS

FIG. 2A is a schematic illustration of an apparatus for denitrification of an aqueous system, in accordance with this invention and as can be used in conjunction with a membrane component of the type illustrated in FIG. 1.

FIG. 2B is a top view of the apparatus of FIG. 2A.

FIG. 2C is a top view of an alternate water treatment apparatus, in accordance with this invention.

Figure 3:
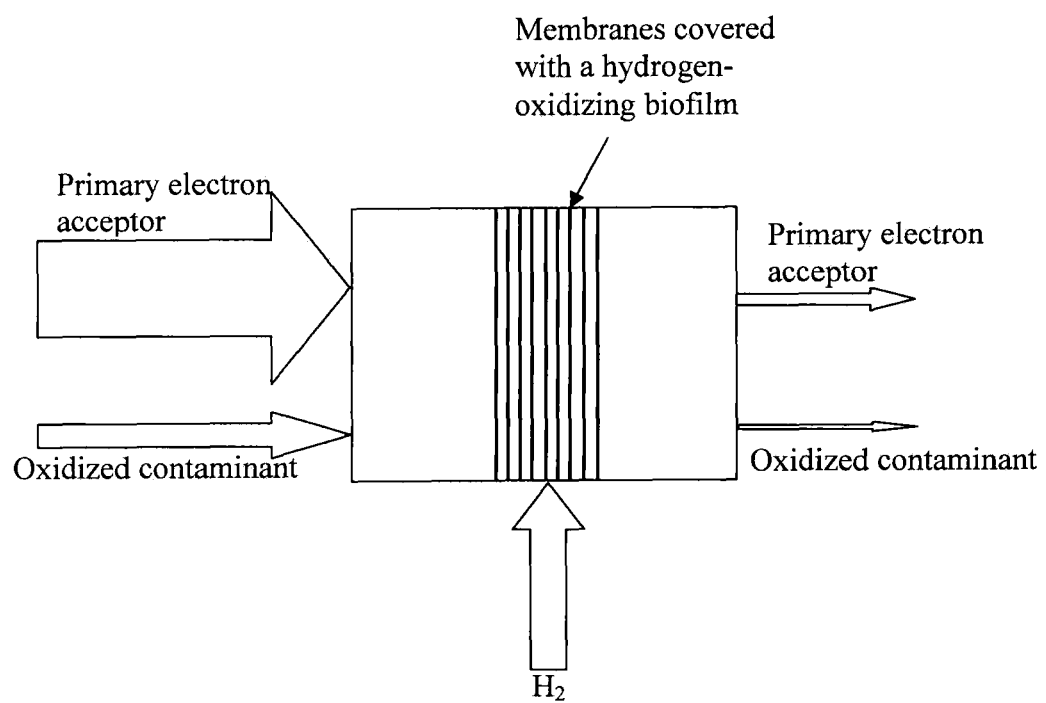

FIG. 3 provides a schematic representation illustrating removal of oxidized contaminants, regardless of apparatus or membrane component configuration, in accordance with this invention.

Figure 4:
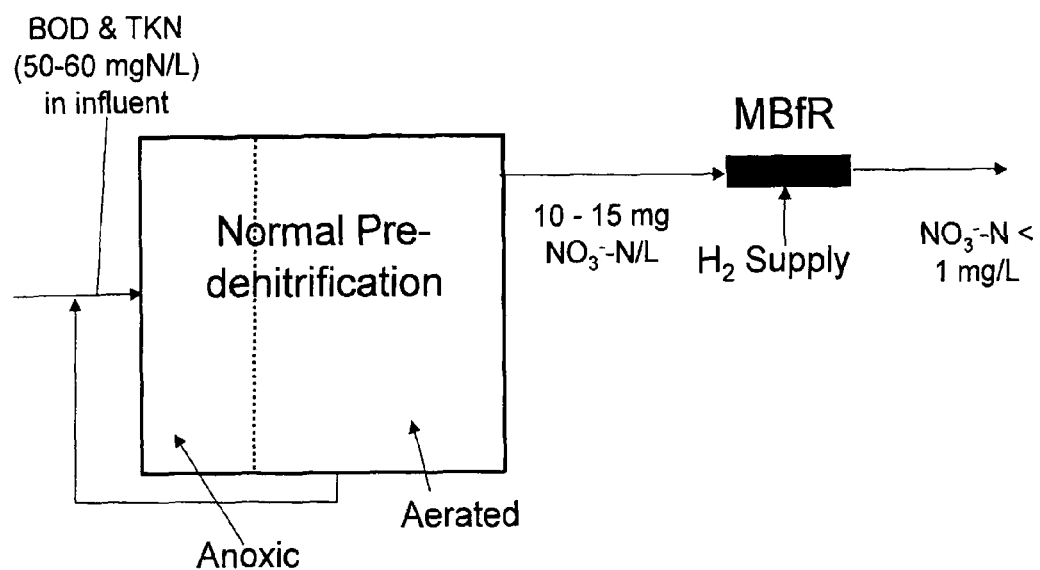

FIG. 4 illustrates schematically use of the present invention for tertiary denitrification, in conjunction with a pre-denitrification process, in accordance with this invention.

Figure 5:
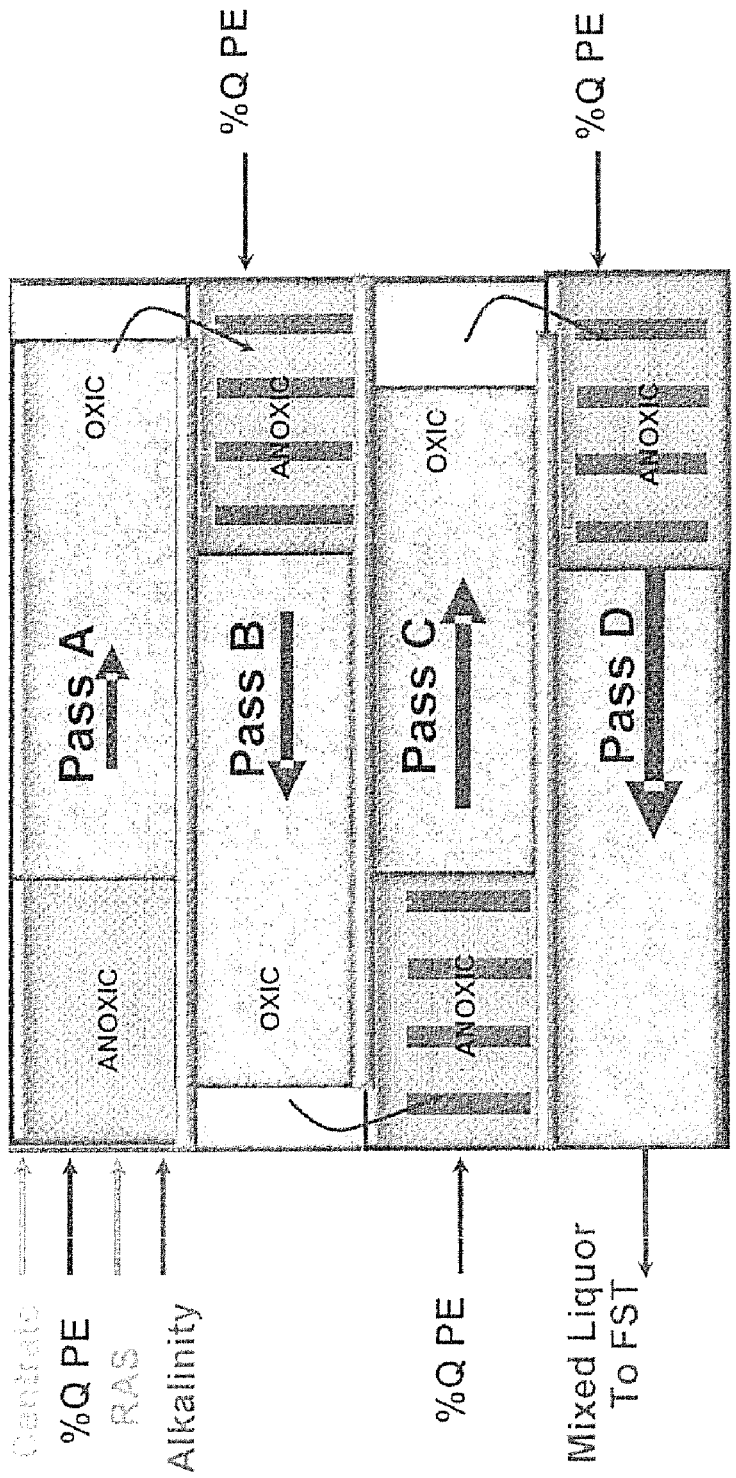

FIG. 5 illustrates the integration of the methods and apparatus of this invention into a pre-denitrification system to augment removal of oxidized nitrogen contaminants.

SUMMARY OF THE INVENTION

In light of the foregoing, it is an object of the present invention to provide an apparatus and one or more methods for groundwater, drinking water, and/or wastewater treatment to remove nitrate and other oxidized contaminants, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide an apparatus for use with existing treatment facilities and configurations, thereby eliminating the need for recirculation pumps of the prior art. As a related objective, the methods and apparatus of this invention can promote movement of aqueous contaminants without restriction to the longitudinal aspect of any fiber membrane component.

It is another object of the present invention to provide an apparatus for wastewater treatment, with variable membrane and/or fiber density, to facilitate movement of solid particles throughout without impeding circulation or discharge.

It is another object of the present invention to provide a method and/or apparatus used in conjunction therewith for enhanced total nitrogen removal, as can be evidenced by effluent concentrations less than about 1 mg/L.

It is also an object of the present invention to provide the wastewater denitrification methodology useful in conjunction with or as an adjunct to existing pre-denitrification techniques—whether in the context of wastewater treatment or removal of oxidized contaminants from ground and/or drinking water sources.

Other objects, features, benefits, and advantages of the present invention will be apparent from this summary and its descriptions of various preferred embodiments, and will be readily apparent to those skilled in the art having knowledge of oxidized contaminants and associated water treatment techniques. Such objects, features, benefits and advantages will be apparent from the above as taken into conjunction with the accompanying examples, data, figures, and all reasonable inferences to be drawn therefrom, alone or with consideration of the references incorporated herein.

In part, the present invention comprises an apparatus for denitrification of an aqueous system. Such an apparatus comprises (1) a hydrogen source; (2) a plurality of membrane components, each membrane component further comprising a passage for hydrogen gas, and each membrane component positioned at a point proximate to the hydrogen source and at a point distal to the hydrogen source; and (3) an inlet component coupling the hydrogen source and the membrane components. Alternatively, the membrane components of such an apparatus are positionally configured to define intercomponent spaces for mixed water movement therethrough. In certain embodiments thereof, the intercomponent spaces are dimensioned sufficient for transverse movement of water thereabout. Each such apparatus embodiment is distinguishable from and can be practiced separate and apart from other embodiments of apparatus or methods described herein.

Regardless, membrane components can be arranged and configured to provide fibers and/or sheets. In certain embodiments, the components are sealed at an end opposite the inlet component. In certain other embodiments, the membrane components are coupled to more than one hydrogen source and a corresponding number of inlet components. As would be understood by those skilled in the art, a manifold inlet component can couple a plurality of membrane components to a particular hydrogen source.

In certain embodiments, whether provided in fiber, sheet, and/or an alternate arrangement, the membrane component can be positioned in a row configuration. Alternatively, fiber membrane components can be positioned in a configuration of rows and columns. With respect to the latter, one or more grid support components can be used to position the fibers at points with respect to one or more hydrogen sources.

As discussed more fully below, each membrane component comprises a substantially non-porous member and/or subcomponent functionally configured to provide hydrogen gas substantially without bubble formation. In certain embodiments especially useful with this invention, such a membrane component can comprise inner and outer layers having a first density and a layer therebetween having a second density later than the first density. Components found especially useful have a substantially non-porous layer between the aforementioned inner and outer layers.

Likewise, as described below, the membrane components can have hydrogen-oxidizing bacteria thereon, under conditions for denitrification or reduction of other oxidized contaminants. Accordingly, an apparatus of this invention can further comprise a container found in water treatment facilities. In particular, such an apparatus can be used in conjunction with an activated sludge tank of the sort used for wastewater treatment.

In part, the present invention also includes a method for water treatment. Such a method comprises (1) providing an aqueous system comprising hydrogen-oxidizing bacteria, a water borne oxidized contaminant, a hydrogen source, and an apparatus of the sort described above comprising a plurality of membrane components; (2) contacting the system with gaseous hydrogen; and (3) reducing the contaminant. Oxidized contaminants treated with the present methodology include but are not limited to nitrate, nitrite, perchlorate, chlorate, chlorite, selenate, selenite, arsenate, bromate, chromate, chlorinated hydrocarbons including chloroform, dichloromethane, dichloroethane, trichloroethane, tetrachloroethane, trichloroethene, and combinations of such contaminants. Whether alone or in combination with another, such an oxidized contaminant optimally has a system concentration sufficient for supporting accumulation of hydrogen-oxidizing bacteria.

As discussed above, the membrane components can be arranged as one or more fibers and/or sheets, with each such component coupled to one or more hydrogen sources. Positional configuration of such components can define intercomponent spaces for movement of water therethrough. Without limitation and as a departure from the prior art, such intercomponent spacing allows movement of water-borne oxidized contaminants transverse to the membrane components, as found especially useful in the treatment of wastewater and other aqueous systems comprising solid particles. While wastewater and the like could compositionally comprise organic electron donors, it will be appreciated by those skilled in the art that the methods of this invention can be effected with hydrogen gas, alone, without need for addition of another electron donor source.

Accordingly, the present invention also includes a method of using a membrane configuration for denitrification of wastewater. Such a method comprises (1) providing an apparatus of the sort described herein, comprising a hydrogen source and a plurality of membrane components having hydrogen-oxidizing bacteria thereon; (2) introducing to the apparatus wastewater comprising an oxidized nitrogen contaminant; and (3) supplying the apparatus with gaseous hydrogen. Regardless of membrane embodiment, whether fiber, sheet or alternate arrangement, the wastewater can be moved by mixing or circulation transverse to the membrane components.

Optimal denitrification proceeds with oxidized nitrogen contaminant (e.g., nitrate or nitrite) wastewater concentration(s) sufficient to support accumulation of hydrogen-oxidizing bacteria on the membrane components. As such, hydrogen gases are preferably supplied substantially without bubble formation and can be achieved with a membrane component comprising a substantially non-porous member.

The oxidized nitrogen contaminant can comprise an aerobic treatment product of a reduced nitrogen contaminant in wastewater. That is, a reduced nitrogen contaminant (e.g., ammonium ion, etc.) can be oxidized under aerobic conditions, with subsequent reduction of the corresponding oxidation product via hydrogen-oxidizing bacteria. Accordingly, the present methodology can be utilized as part of a tertiary treatment process, post-pre-denitrification, or as integrated in a pre-denitrification system to enhance performance. Regardless, denitrification as described herein can reduce total oxidized nitrogen concentration to a level less than about 1 mg/L.

DETAILED DESCRIPTION OF CERTAIN EMBODIMENTS

Hydrogen is an ideal electron donor for bioreactors reducing oxidized anions because (1) it is less expensive, per electron equivalent, than organic donors, such as acetate or methanol; (2) it is non-toxic, increasing public acceptance for its use for water treatment; (3) it is sparsely soluble, so it is not possible to "overdose" the system and cause re-growth; and (4) it can be generated on-site. The historic disadvantage is that hydrogen is difficult to deliver without sparging, a wasteful and potentially dangerous process. However, a hydrogen-based bioreactor, such as a membrane biofilm reactor (MBfR) of the type described herein, can deliver hydrogen safely and efficiently without sparging.

Pressurized hydrogen is supplied to the component interior and diffuses to a biofilm growing on the membrane surface. The biofilm consumes hydrogen as it reduces oxidized contaminants present in the water. Schematically illustrated in FIG. 1, membrane component 10 can comprise non-porous layer structures 12 positioned between outer and inner microporous layer structures 14a and 14b, respectively. Passage 16, as defined by such a configuration, provides hydrogen gas for diffusion through membrane component 10 and consumption by biofilm 18.

Figure 1:
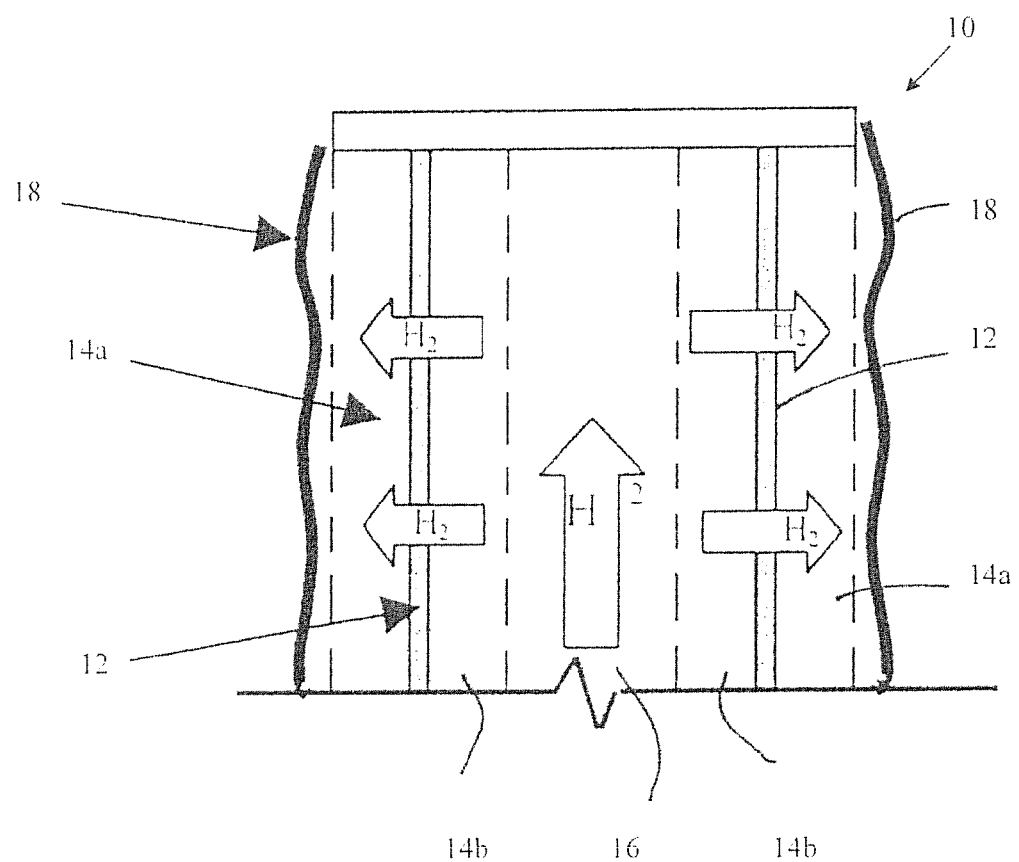
FIG. 1 is a schematic cross-sectional illustration of a membrane component, in accordance with this invention.

The membrane illustrated in FIG. 1 represents but one configuration useful in conjunction with the present invention. Various other membrane arrangements and configurations can be utilized, limited only by their ability to provide hydrogen gas to a system at a rate and concentration with consideration of the solubility of hydrogen in water and the risk of explosion. Generally, good results and economy are achieved with a membrane that can reduce, minimize, or eliminate bubble formation. For instance, a hollow membrane constructed of a dense, non-porous material—whether or not wholly or in part provided with one or more microporous components (e.g., adjacent to or therebetween)—can be used with good effect. For instance, membrane component 10 can be constructed from two non-porous layer structures 12 absent outer microporous structure(s) 14a, absent microporous structure(s) 14b, or absent both microstructure(s) 14a and 14b. Likewise, a single non-porous structure 12, with or without any combination of microporous structures 14a and 14b, can be used effectively with passage 16 (e.g., attached conduit, duct, etc.) providing adequate connection with a hydrogen source, such connection sufficient for accumulation of hydrogen-oxidizing bacteria on membrane component 10. Various other arrangements or configurations can be employed with the understanding that increased bubble formation increases risk of explosion, lowers system economy, and tends to disrupt biofilm formation.

Likewise, the apparatus of this invention is not limited to any one arrangement or configuration. Variations of biofilm reactor 20 are shown in FIGS. 2A-C. With non-limiting reference to FIG. 2A, apparatus 20 can be situated within tank 22 containing an aqueous medium of oxidized contaminants. One or more support grids 24 positionally configure fiber membrane components 26 and can be, as shown, suspended from tank/container closure 28. Fiber membrane components 26 are coupled to a hydrogen source via inlet 30 and extend to terminus 32. Influent port 34 and effluent port 36 can be used to regulate treatment rate and volume. Mixing/stirring mechanism 38 can comprise a paddle or similar such component useful in treatment of wastewater, to facilitate movement of water borne contaminants about the membrane components.

Hydrogen gas is directed inside fiber membrane components 26 from the hydrogen source. With sealed fiber ends, the hydrogen gas is contained under a controlled pressure within individual fibers. The gas can diffuse through a non-porous layer structure of the sort described above, for metabolic interaction with an accumulated biofilm and the subject oxidized contaminant(s). Such conditions induce a high driving force for gas dissolution without bubble formation. Other components useful with apparatus 20 can vary as any suitable system known in the art may be used for water delivery to and removal from container 22. Likewise, those skilled in the art will appreciate that such an apparatus can further comprise components for pH control and introduction of other water treatment reagents.

Hollow fibers of the sort useful in the apparatus of FIGS. 2A-B are manufactured by Mitsubishi Rayon (Model MHF 200TL) and are available as a composite. The wall of the particular fiber was made up of two different materials. The outer and inner layers of the fiber wall were composed of microporous polyethylene. Between the two layers was a 1-micron thick layer of non-porous polyurethane. This non-porous layer allowed the creation of a high driving force for gas dissolution without premature bubble formation, the desirability of which is as previously mentioned. The hollow fibers were sealed on one end and open to the pressurized hydrogen supply on the other end. With reference to FIG. 2B, rows and columns of such fiber membrane components 26 can be arranged in grid support component 24. An alternate membrane arrangement is shown schematically in FIG. 2C, where such components are provided as positionally configured sheets 40. As mentioned above, however, in conjunction with FIG. 1, other membrane component constructions and/or configurations can be used without regard to number, form, scale or dimension.

As discussed elsewhere herein, MBfRs of the prior art are effective for removing oxidized contaminants from ground and drinking water, but less suited for a wastewater setting. Wastewater contains a large amount of solids, which could lead to fouling in an enclosed-tube configuration, such as that described in the '262 Patent. An MBfR used in conjunction with a container or basin provides greater membrane choice and/or separation, would allow for mixing with less energy, and would allow greater flexibility for cleaning and maintenance. Additionally, the present invention now provides for retrofitting an existing activated sludge tank.

Accordingly, an MBfR apparatus of this invention, useful in conjunction with an activated sludge basin, was developed for treating wastewater. One embodiment of a reactor is described below for a bench-scale application. A full-scale application is consistent therewith and would be understood by those skilled in the art made aware of this invention. With reference to FIGS. 2A-B, a bench-scale MBfR system can comprise hollow-fiber membranes, hydrogen gas supply system, substrate and buffer storage tank, and associated feed pump, flow meter, stir plate, and effluent collection tank. An apparatus of the sort presented in FIG. 2A was constructed using a section of polycarbonate pipe, capped on each end with polycarbonate plates. Hollow-fiber membranes are attached to the top plate. A stir-bar at the bottom of the reactor keeps the reactor well-mixed. Hydrogen is supplied to the fibers through a manifold in the plate. A second "dead-end" manifold on the top plate collects the distal ends of the fibers. This manifold is normally sealed, but can be opened to purge the fibers. The reactor specifications are provided below.

| MBfR Specifications | |
|---|---|
| Net reactor volume | 300 mL |
| Height | 9 cm |
| Diameter | 7 cm |
| Height of fiber support | 6 cm |
| Number of individual fibers | 51 |
| Total number of holes in support grid | 130 |
| Number of fibers per grid hole | 3 |
| Total length of fibers | 23.4 m |
| Total surface area of fibers | 206 cm$^2$ |

A total of 51 individual hollow fibers are provided, with a total surface area of about 206 cm$^2$. Mixing provided by a stir-bar improves mass transfer to the biofilm, prevents the fibers from sticking together, and minimizes fouling of the membranes by excess biomass accumulation. Hydrogen gas is supplied by a pressurized gas cylinder. As illustrated in FIG. 1, hydrogen gas is fed to one end of the reactor, filling the inside of the fibers and diffusing through the membranes. The hydrogen pressure is preferably maintained below the bubble-point of the membrane, eliminating the formation of a hydrogen atmosphere within the bioreactor.

In a conventional autohydrogenotrophic system, a fixed-film or fluidized-bed biofilm reactor, in which all substrates (such as nitrate and hydrogen) are transferred from the liquid phase into the biofilm, is utilized. An apparatus such as that provided in FIG. 2A scheme offers an important advantage over convention. Since the biofilm is on the surface of the hollow fiber, the hydrogen flux goes directly into the biofilm. Nearly 100% utilization of hydrogen is attained, making the process more economically favorable and safer. Preliminary studies were conducted on nitrate and perchlorate reduction by an autohydrogenotrophic MBfR and establish certain principles pertaining to this invention. The membrane fibers used therewith were installed in a tube reactor, of the '262 Patent, about 1 m long. The prototype contained 83 fibers that provided 750 cm$^2$ of surface area for biofilm attachment (specific surface area was 180 m$^{-1}$). Feed and recycling flow rates during the experiments were fixed at 10 and 1,750 ml/min, respectively. The recycle controlled the liquid flow velocity for good mass transport and to prevent fiber clumping. The system was seeded initially with *Ralstonia eutropha*, but a diverse mixed culture developed over time.

As described in the aforementioned '262 patent, as an electron donor, hydrogen gas is oxidized by species of hydrogen-oxidizing bacteria with release of electrons for reduction of contaminant(s). For example, nitrate is reduced in a step wise fashion to innocuous nitrogen gas:

$$NO_3^- + 2H^+ + 2e^- == NO_2^- + H_2O$$

$$NO_2^- + H^+ + e^- == NO + OH^-$$

$$NO + H^+ + e^- == 0.5N_2O + 0.5H_2O$$

$$0.5N_2O + H^+ + e^- == 0.5N_2 + 0.5H_2O$$

$$NO_3^- + 5H^+ + 5e^- == 0.5N_2 + 2H_2O + OH^- \text{ (overall)}$$

With reference to the results provided in the '262 Patent, the influent nitrate concentrations were 10 and 12.5 mg N/l for the first and second steady states, respectively. At steady-state with a liquid retention time of 40 min, there were achieved the desired partial removals of nitrate between 76 and 92% with effluent hydrogen concentration as low as 9 μgH$_2$/L. The nitrate flux was as high as 1 g N/m$^2$-d due possibly to the "counter-diffusion" type of substrate transfer. Fiber clumping, and the biofilm detachment rate from the fibers were very low, about 0.015/day.

For each steady state, nonsteady-state experiments were run to test the MBfRs response to nitrate loading and hydrogen pressure. Each short-term study lasted for more than three liquid retention times to allow the formation of a pseudo-steady state in the reactor. The nonsteady-state experiments show that adjustments to the hydrogen pressure to the hollow fibers easily and rapidly controlled the effluent nitrate concentration and % nitrogen removal. For example, a loading of 0.1 mgN/cm$^2$-d (=1 gN/m$^2$-d) gave nearly 100% NO$_3^-$ removal when the hydrogen pressure to the fibers was 6.6 psi (0.45 atm), but reducing the hydrogen pressure to 3 psi (0.2 atm) gave partial removal of 50%. For drinking-water treatment, the goal is to keep the effluent NO$_3^-$—N below the standard of 10 mgN/L, which makes partial removal feasible and desirable. Other applications may require full nitrate removal and, therefore, higher hydrogen pressure.

Representative of other oxidized contaminants treated with the present invention, perchlorate ion (ClO$_4^-$) can originate from a variety of ammonium, potassium, magnesium, or sodium salts. Ammonium perchlorate, for example, is a primary ingredient of solid rocket fuel. The short shelf-life of rocket fuel has created an environmental concern given the large volume of perchlorate-containing wastes generated over the years by unused fuel. At least 20 states have confirmed perchlorate contamination, and more sites may be found, as perchlorate has been used or manufactured in up to 40 states. Perchlorate is understood to inhibit thyroid function and is suspect in various other health-related issues. The State of California, recognizing the problem, recently lowered its perchlorate drinking water action level from 18 to 4 μg/L. Even so, a recent toxicological and risk characterization study by the Environmental Protection Agency suggests 1 μg/L as a treatment goal for drinking water.

Perchlorate is not removed by conventional physical-chemical water treatment techniques, and other processes, such as ion exchange, electrodialysis, and reverse osmosis are costly and result in a concentrated perchlorate waste stream that still requires disposal. As a result, perchlorate contamination of groundwaters continues to be an environmental issue. Perchlorate can be reduced, however, to chloride by perchlorate-reducing bacteria, which use perchlorate as an electron acceptor for growth. Perchlorate-reducing bacteria are readily obtainable in the environment, have a wide range of metabolic capabilities, such as aerobic growth and denitrification, and do not require specialized growth conditions—all attributes suitable for a perchlorate treatment system. Recent work has shown that bioreactors can reduce perchlorate to below 4 μg/L when the initial concentration is high or when the reactor has been previously operated at high perchlorate concentrations. However, low initial perchlorate concentrations, in the µg/L range, may preclude biomass growth on perchlorate as the sole acceptor electron growth.

Even so, microbial treatments such as those described in the '262 patent leave several concerns as open issues. For instance, while nitrate/nitrite reduction is discussed, therein, and other oxidized contaminants are mentioned as likewise treatable, concurrent treatment of multiple contaminants remains unaddressed. The '262 patent does not disclose concurrent treatment, and work thereafter appears to indicate full nitrate removal is required for perchlorate reduction to useful levels. Regardless, the present invention can be used for concurrent treatment of multiple oxidized contaminants, as part of a comprehensive treatment methodology.

To demonstrate related methods of this invention, the same laboratory prototype reactor described above was used with addition of perchlorate. Immediate perchlorate removal (roughly 40% removal from 1,600 µg/L) was observed, and the removal increased over two weeks to nearly 100%, showing that the autotrophic denitrifiers were capable of reducing perchlorate, but that the growth of bacteria with better capability to remove perchlorate occurred over time. Perchlorate reduction to innocuous, chloride ion is believed to be achieved via an 8-electron pathway:

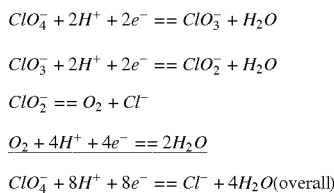

$$ClO_4^- + 2H^+ + 2e^- == ClO_3^- + H_2O$$
$$ClO_3^- + 2H^+ + 2e^- == ClO_2^- + H_2O$$
$$ClO_2^- == O_2 + Cl^-$$
$$O_2 + 4H^+ + 4e^- == 2H_2O$$
$$ClO_4^- + 8H^+ + 8e^- == Cl^- + 4H_2O \text{(overall)}$$

Perchlorate removal was somewhat affected by a high nitrate concentration in the reactor. $NO_3^-$—N greater than about 0.1 to 0.2 mg/L slowed perchlorate reduction, and $NO_3^-$—N above about 0.5 mg/L slowed perchlorate reduction by 50% or more. On the other hand, increasing the hydrogen pressure increased perchlorate removal, and the effect was much more dramatic than for denitrification.

After completing systematic studies with a laboratory prototype, it was used with perchlorate-contaminated groundwater: the groundwater with its normal $ClO_4^-$ concentration of 6 µg/L, and also with a $ClO_4^-$ concentration spiked to 100 or 50 µg/L. Removal of perchlorate below the 4 µg/L action level was observed in all cases. Stoichiometric computations based on the removals of all electron acceptors in the groundwater (i.e., 24 mg/L of $NO_3^-$—N, 6 mg/L of $O_2$, and 60 µg/L of $ClO_4^-$) show that hydrogen utilization is almost exactly equivalent to acceptor reduction—indicating that no hydrogen is wasted, a consideration for good economy and safe operation.

Hydrogen-oxidizing bacteria are known to those skilled in the art and would be understood by those made aware of this invention as including both hydrogen-oxidizing, autotrophic bacteria, as well as those bacteria also able to utilize organic carbon and other energy sources in addition to hydrogen. Without restriction to any one theory or mode of operation, this invention can be used to remove perchlorate and other non-nitrogenous oxidized contaminants with sufficient levels of such contaminants as electron acceptors or in the presence of another electron acceptor. A primary electron acceptor is an oxidized component reduced in conjunction with the aforementioned oxidation (e.g., perchlorate, etc.), such reduction at least in part sufficient to sustain a viable biomass within the aqueous system. A component capable of providing such a function would be understood by those skilled in the art and made aware of this invention. Such reduction providing energy for growth can be referred to as a dissimilatory reduction, with perchlorate as a secondary acceptor in the context of this methodology. Without limitation, a primary electron acceptor component can be selected from oxygen and nitrate anion—either one of which preferably has a system concentration at least in part sufficient to support accumulation of bacteria—or a combination thereof.

Regardless of the chemical identity of such a component functioning as a primary electron acceptor, such a component can be introduced to such a system prior to introduction of a perchlorate component, such that a sustainable biomass can be achieved. Alternatively, such a component can be introduced concurrent with that of the perchlorate component to the system. Accordingly, with regard to the latter, the primary electron acceptor component (e.g., nitrate anion) can be influent to the system with a waste stream comprising the subject perchlorate component. As illustrated by several of the following examples, the present invention can be utilized with influent perchlorate concentrations greater than about 100 µg/L or below which would not otherwise—in the absence of a primary acceptor—support biofilm accumulation. Regardless, effluent concentrations can be less than about 4 µg/L, meeting applicable state and/or federal guidelines.

Without limitation, as provided by one of several embodiments, the oxidized contaminant can be perchlorate, chlorate, chlorite, or a combination of such contaminants. Other oxidized contaminants removed by the present methodology include those described herein. As demonstrated by several examples below, repetitious or continuous introduction of the oxidized contaminant can promote concurrent removal of the primary electron acceptor. Likewise, such introduction can enhance removal of the oxidized contaminant, such enhancement as can be expressed in terms of rate of or time for removal. Without limitation, as presented under conditions of surface or groundwater contamination, the primary electron acceptor component and the oxidized contaminant are influent to the system. Regardless, such a system can be used in conjunction with another water treatment process; that is, as an adjunct to another system for enhanced or complimentary removal of contaminants.

Schematically, such methodologies of this invention can be considered with reference to FIG. 3. Primary electron acceptor and oxidized contaminant components can, optionally, be introduced at various levels relative one to another, as indicated. Contact of a system comprising hydrogen-oxidizing bacteria provides corresponding reduction and removal of the components. Such a method can be employed without restriction to any one biofilm reactor apparatus, fiber or membrane configuration, consistent with the broader aspects and considerations of this invention.

Regardless of the presence of perchlorate or other such oxidized contaminants (see, Example 7), the present invention can also be utilized for wastewater treatment. As such, the apparatus and methods described herein meet several goals and objectives. The need for additional of an extraneous organic electron donor is eliminated, thereby minimizing excess sludge production, chemical costs, handling and toxicity concerns. Further, this invention can be easily integrated into a variety of wastewater treatment systems. More specifically, integration into existing or new activated-sludge systems can be achieved by either (1) using this invention for tertiary denitrification or post treatment to remove nitrate (or nitrite) remaining after conventional treatments such as pre-denitrification, or (2) incorporating an apparatus and/or methodology of this invention directly into a pre-denitrification system to enhance performance without construction of an adjunct tertiary system. The goal of tertiary denitrification with the MBfR is to reduce the effluent $NO_3^-$ concentration to an advanced-treatment standard (e.g., $\leq 1$ mgN/L), in conjunction with a conventional pre-denitrification process which can bring the $NO_3^-$ concentration down to about 10-about 15 mgN/L. FIG. 4 illustrates how a tertiary system comprising this invention could be employed in a typical post-treatment scenario. This application is similar to the drinking-water settings that have been investigated for denitrification, although two differences are evident. First, the effluent criterion for $NO_3^-$ is lower for wastewater treatment: $\leq 1$ mgN/L versus well below the drinking-water standard of 10 mgN/L. Second, the influent to the MBfR is likely to contain a significant concentration of suspended solids, which are absent or negligible in drinking-water treatment. The physical configuration of an apparatus of this invention can accommodate influent solids without fouling the membrane components. One advantage of using a $H_2$-based MBfR in tertiary denitrification is that the autotrophic biomass yield is low, which means that the solids concentration in the effluent will be low, thereby minimizing solids load to downstream filters, if employed. If no downstream filters are in place, the effluent suspended solids, COD, and N due to released biomass will be low.

Alternatively integrating an MBfR of this invention into pre-denitrification obviates the need to construct any tertiary-treatment apparatus or facility. The benefits for capital costs and space are obvious. FIG. 5 schematically illustrates how MBfR units could be integrated into a multiple-pass (e.g., with return-activated sludge, RAS, and/or a primary effluent, PE, component), pre-denitrification system known in the art to augment the capacity for $NO_3^-$ removal from wastewater. Use of an inventive apparatus in conjunction with an anoxic component of such a pre-denitrification system, with alternating passes to and from an oxic component, provides a low oxidized nitrogen effluent for routing to a final settling tank (FST). Integration creates a hybrid biofilm/suspended-growth system in which the biofilm is dominated by $H_2$-oxidizing autotrophs, while the suspended bacteria are BOD-oxidizing heterotrophs and autotrophic nitrifiers. Achieving integration involves a number of technical challenges: preventing fouling of the membranes from the suspended biomass and influent solids, good mass transfer to the membranes, biofilm control on the membranes, controlling the oxygen concentration to allow good nitrification, but not create a large $H_2$ demand to reduce $O_2$, and locating the MBfR units in the best place to gain very low effluent $NO_3^-$ concentration while using the influent BOD as much as possible for denitrification.

EXAMPLES OF THE INVENTION

The following non-limiting examples and data illustrate various aspects and features relating to the apparatus and methods of this invention, including the treatment of nitrate, perchlorate and other oxidized contaminants, as can be achieved through the techniques described herein. While the utility of this invention is illustrated through use of one or more articles, devices or apparatus that can be used therewith, it will be understood by those skilled in the art that comparable results are obtainable with various other articles/devices and apparatus, as are commensurate with the scope of this invention.

With regard to the present examples, perchlorate was analyzed by ion chromatography (IC) using a Dionex DX-320 (pilot) or 4000i (bench) with conductivity detection. An AS-16 or AS-11 column was used followed EPA Method 314.0. The lowest standard used during calibration was 2 µg/L. All anions other than perchlorate (i.e., chloride, chlorate, chlorite, nitrate, among others) were analyzed on the same systems based on EPA Method 300.1 modified for a hydroxide-selective column. Dissolved hydrogen was analyzed with a reduction gas analyzer (Trace Analytical RGA3) using a headspace analysis described in the literature.

Demonstrating various aspects of the present invention, the data of examples 1-7 was obtained using a hollow-fiber membrane biofilm reactor of the prior art. Comparable results are obtainable with various apparatus configured and ascribed herein, whether or not a particular oxidized contaminant is utilized alone or in the presence of another electron acceptor, as would be understood by those skilled in the art made aware of this invention.

Example 1

In drinking-water treatment, a goal is to remove $NO_3^-$ to below the standard, which typically is 10 mgN/L. Therefore, partial $NO_3^-$ removal to levels below the standard is acceptable, as long as partial removal is reliable and no other water-quality problems are introduced. Partial or full $NO_3^-$ (and nitrite) removal can be achieved and easily controllable. Adjusting the $H_2$ pressure to the interior of the membranes simply and reliably controlled the effluent concentration of $NO_3^-$—N. Within the $H_2$-pressure range of about 0.15 to 0.6 atmospheres, the effluent $NO_3^-$ concentration could be controlled systematically from less than 0.1 mgN/L for the higher $H_2$ pressures and low to moderate $NO_3^-$ surface loading to 10 mgN/L for the lower $H_2$ pressure and a high $NO_3^-$ surface loading. Increasing the $H_2$ pressure inside the membranes increased the $H_2$-delivery capacity, making it possible to drive the $NO_3^-$ concentration to very low level, treat a higher surface loading of $NO_3^-$, or a combination of both. In most cases, the $NO_2^-$ concentration was less than 1 mgN/L, and increasing the $H_2$ pressure made it possible to drive effluent $NO_2^-$ to less than 0.1 mgN/L.

Generally, denitrification also showed that the biofilm that accumulated on the outside of the membranes in the bench-scale MBfR was dense and strong. The specific detachment rate was very low (<0.02/d), and the effluent biomass concentration was correspondingly low (c. 1 mg/L). The biofilm produced some soluble microbial products, giving a typical effluent BDOC of 0.5 mg/L, which can be eliminated by downstream biofiltration. The net acid consumption of denitrification required attention to pH buffering, but this situation is true for all denitrification processes.

Example 2a

Biological perchlorate reduction was studied in a denitrifying MBfR. The MBfR medium was based on tap water, and the reactor was seeded with bacteria from an MBfR used in a previous denitrification study. The seed included a mixed microbial population of autotrophic, denitrifying bacteria. After reaching steady-state with nitrate, and without having had any previous exposure to perchlorate, the MBfR influent was supplemented with 1,000 to 1,800 µg/L perchlorate. The reactor hydraulic detention time was 45 minutes, and it had a high recirculation rate to promote completely-mixed conditions. Initial nitrate removal was around 98%, while initial perchlorate reduction was 60% (data not shown). Perchlorate reduction increased to 99% over 18 days, while the nitrate reduction rate remained approximately the same. The slow improvement in perchlorate reduction suggests an enrichment for specialized, perchlorate-reducing bacteria.

Example 2b

The MBfR described above was tested with a perchlorate-contaminated groundwater collected from a well owned and operated by the Suburban Water Company, located in the Main San Gabriel Basin, California. No chemical additions, other than perchlorate and hydrogen, were made during the groundwater experiments. The influent nitrate concentration was 2.6 to 3.0 mgN/L. Three phases of testing were used over a period of 28 days. First, the groundwater was applied for 7 days with its natural perchlorate concentration of 6 µg/L, representing a low-perchlorate scenario. Second, the feed water was spiked with 100-µg/L perchlorate for 15 days, representing a high range of perchlorate in most contaminated groundwaters in Southern California. Finally, the reactor feed was spiked with 50 µg/L perchlorate for 5 days, representing a mid-range of perchlorate contamination. The reactor operating conditions were similar to those described above. For all three phases of the test, the effluent perchlorate varied from non-detect (less than 2 µg/L) to 4.5 µg/L, and the effluent nitrate varied from 13 to 32 µgN/L, which corresponds to at least 99 percent removals of perchlorate and nitrate.

The groundwater experiments clearly demonstrate the feasibility of using the MBfR to remove perchlorate from groundwater that also contains nitrate. The reactor consistently achieved removals at or below the MRL of 4 µg/L over a four-week period. The reactor also responded well to sudden changes in perchlorate concentrations. For example, when the influent concentration was suddenly increased from 6 µg/L to 100 µg/L, the effluent perchlorate concentrations did not increase above 4 µg/L.

Example 2c

The above MBfR was switched from tap water to a minimal medium prepared from reverse-osmosis-treated water. Both media contained 5 mgN/L nitrate and 1,000 µg/L perchlorate. Prior to starting the reverse-osmosis medium, the effluent perchlorate was non-detect. Immediately after starting the minimal medium, the effluent perchlorate concentration increased from non-detect to around 300 µg/L. The rate of nitrate reduction was not affected. Over several months, the perchlorate reduction rate further deteriorated, with effluent concentrations exceeding 900 µg/L. However, when the tap water medium was restored, the effluent perchlorate decreased to non-detect after 16 days. This "acclimation" time period is similar to the 18 days it took to achieve maximum perchlorate removal when perchlorate was first introduced into the hydrogen reactor during the screening experiment. On the 16$^{th}$ day, RO-medium was reintroduced and effluent perchlorate increased to 360 µg/L by the next day, reaching 500 µg/L on day 21. At the end of day 21, tap-water medium was introduced a second time, and the next day perchlorate had returned to non-detectable levels. During all 21 days, the effluent nitrate concentration remained practically unchanged. This experiment shows that the minimal media lacked for perchlorate reduction, but not for denitrification. The slow disappearance of perchlorate reduction suggests the loss of specialized perchlorate-reducing bacteria.

The subsequent increase of perchlorate reduction in the presence of tap water medium suggests a renewed enrichment of perchlorate-reducing bacteria.

Example 3a

*Dechloromonas* sp. PC1 is an autotrophic, hydrogen-oxidizing, perchlorate-reducing and denitrifying bacterium isolated from the reactor described in Example 1. Batch tests were carried out to determine the kinetic parameters $q_{max}$, Y, and K for PC1 (GenBank accession number AY126452). The kinetic parameters were determined for autotrophic growth using hydrogen as an electron donor. The Y and $q_{max}$ were determined using batch experiments with high initial acceptor and low initial biomass concentrations. The K was determined using batch non-growth tests with low initial biomass and acceptor concentrations. The experiments used 1-L bottles filled with 200 mL of media or 160 mL serum bottles filled with 25 mL of media, capped with butyl rubber stoppers, vacuum degassed, and filled with a gas mixture of 95% hydrogen and 5% $CO_2$ (for $q_{max}$ and Y) or with pure hydrogen (for K). The bottles were shaken on their side at 200 rpm. The experiments were carried out at least in triplicate. The growth medium contained, per liter: 1.386 g $Na_2HPO_4$, 0.849 g $KH_2PO_4$, 0.1 g $(NH_4)_2SO_4$, 0.2 g $MgSO_4.7H_2O$, 1 mg $CaCl_2.2H_2O$, and 1 mg $FeSO_4.7H_2O$. The trace mineral solution is described in the literature. The K experiments were carried out in a 12-mM phosphate buffer at pH of 7 with no nutrients or trace minerals. The pH was adjusted using 1 M NaOH for a final pH of 7.0. Curve fitting was used to estimate kinetic parameters $q_{max}$ and K for PC1 using a finite-differences solution of the substrate-utilization and biomass-growth equations:

$$\frac{dS}{dt} = -\frac{q_{max}S}{S+K}X, \text{ and } \frac{dX}{dt} = \frac{Yq_{max}S}{S+K}X - bX.$$

Such relationships neglect competitive inhibition from chlorate during perchlorate reduction, providing a $q_{max}$ for perchlorate is an "apparent" value, valid only for the perchlorate range for which it was determined.

Example 3b

As shown in Table 1, the yields for perchlorate were very similar to those for nitrate. This is consistent with the similar Gibb's free energy at pH 7 (ΔGo) for perchlorate and nitrate reduction with hydrogen (118 and 112 kJ/eq e-H2, respectively). The $q_{max}$ for nitrate reduction was around 6 times higher than for perchlorate, on an electron-equivalent (or hydrogen-accepting) basis, demonstrating growth on nitrate much faster that on perchlorate. The K value for perchlorate was 0.15 mg/L, two orders of magnitude lower than values from the literature for other perchlorate-reducing bacteria.

Based on the kinetic parameters, the $S_{min}$ for perchlorate is 40 µg/L. This is an approximate value, since $q_{max}$ does not include competitive inhibition with chlorate. It is unlikely that the actual $S_{min}$ would be much less than this value, suggesting perchlorate can not be reduced to 4 µg/L and/or below levels permissible under regulation with perchlorate as the sole electron acceptor.

TABLE 1

Kinetic parameters for *Dechloromonas* sp. PC1

| S | $q_{max}$ (eq $e^-H_2$/g X-day) | Y (gX/eq $e^-H_2$) | K (mg/L) | $S_{min}$ (μg/L) |
|---|---|---|---|---|
| $ClO_4^-$ | 0.25 | 2.88 | 0.15 | 40 |
| $NO_3^-$ | 1.43 | 2.46 | >0.05 | <2 |

Notes:
(1) "eq $e^-H_2$" = equivalent of electrons from hydrogen;
(2) 1 eq $e^-H_2$/ = 1 g $H_2$;
(3) b = 0.1 1/day Kinetic parameters found for other perchlorate-reducing bacterial suggest the same. See, Logan, B. E., H. S. Zhang, P. Mulvaney, M. G. Milner, I. M. Head and R. F. Unz (2001). Kinetics of perchlorate- and chlorate-respiring bacteria. *Applied and Environmental Microbiology* 67(6): 2499-2506. Other experiments (not shown) demonstrate that nitrate or oxygen can serve as primary acceptors that allow concurrent perchlorate removal. Even if the perchlorate concentration is low compared to nitrate or oxygen, perchlorate helps select for a perchlorate-reducing population. Since most wastewaters, groundwaters and surface waters contain nitrate, oxygen, or both, the MBfR is likely to be effective for a wide range of field applications.

Example 4a

Two bench-scale MBfRs were seeded with a mixed culture from another reactor. The primary acceptor for one reactor was 8-mg/L oxygen, and 5 mgN/L nitrate (plus a minor influent $O_2$ concentration of about 6 mg/L) for the other. A minimal medium based on reverse-osmosis water was used. The physical characteristics are summarized in Table 2, below. A high recirculation rate provided completely mixed conditions. After reaching effluent steady state with the primary acceptors, perchlorate was added to the influent: 1,000 μg/L perchlorate for the oxygen reactor, and 100 μg/L for the nitrate reactor.

TABLE 2

Bench-scale reactor characteristics

| PARAMETER | BENCH-SCALE |
|---|---|
| Feed rate | 1 mL/min |
| Recirculation ratio | 150 |
| Detention time | 24 min |
| Number of modules | 1 |
| Module length | 25 cm |
| Module diameter | 0.6 cm |
| Number of fibers per module | 33 |
| Total fiber surface area | 72.3 cm$^2$ |

Example 4b

The two bench-scale MBfRs of example 3a were operated for 20 days with 5-mgN/L nitrate or 8-mg/L oxygen. In the nitrate reactor, the effluent nitrate reached 0.01 mgN/L after around 10 days. In the MBfR with oxygen and no nitrate, the DO levels were below 0.1 mg/L after 4 days of operation. After 20 days, 100-μg/L and 1,000-μg/L perchlorate was added to the nitrate and oxygen reactors, respectively. In the nitrate reactor, the initial removal was 30%, but it increased to more than 90% after 4 days. In the oxygen reactor, the initial removal was 5%, but it increased to more than 99% after 12 days. These results illustrate that even low levels of perchlorate can provide a selective pressure for perchlorate-reducing bacteria, dramatically improving removals. Also, it shows that oxygen can serve as a primary acceptor for perchlorate reduction. Reference is also made to examples 6a-b below.

Example 5

With reference to the membrane configuration of FIG. 1, and the apparatus of FIGS. 2A and 2B, hollow fiber membranes can be about 280 μm in diameter with an approximate 40-μm wall, are preferably but not required to be made of two materials: a 1-μm layer of dense polyurethane encased within microporous polyethylene (FIG. 1). Because the fiber material is hydrophobic, the pores remain dry and do not foul. The dense polyurethane layer prevents bubbling at higher gas pressures, allowing a wide range of gas of pressures that offer a high degree of control over the hydrogen-delivery rate. A scanning electron micrograph (SEM) image of the fiber wall and a confocal laser scanning micrograph (CLSM) image of biofilm on the hollow-fiber membrane are consistent with the preceding and confirm biomass accumulation.

Example 6a

Some hydrogen-oxidizing, perchlorate-reducing bacteria (PCRB) can denitrify and reduce perchlorate concurrently, with nitrate as a primary acceptor. This example demonstrates various aspects of this invention and explore whether PCRB or non-perchlorate-reducing denitrifiers predominate when an environmental inoculum is used. The microbial ecology of mixed-culture, perchlorate-reducing and denitrifying MBfRs was investigated using activity tests and confirmed using molecular techniques.

Hydrogen is supplied through hollow-fiber-membranes. Water containing a primary acceptor, either nitrate or oxygen, is recirculated past the exterior of the membranes, and a biofilm grows on the membrane surface. Five identical MBfRs were used. Nitrate was the primary acceptor for reactors R1 through R4, and it was oxygen for R5. The detention time was 25 minutes, and the inoculum was a small amount of biofilm from an MBfR treating groundwater with 5 mgN/L nitrate and 60 μg/L perchlorate. After reaching steady state with the primary acceptor, 0, 100, 1,000, and 10,000 μg/L of perchlorate were added to the reactors R1, R2, R3, and R4, respectively. Table 3 shows the experimental conditions.

TABLE 3

| Sample | | $NO_3^-$ conc. (mg/l) | $ClO_4^-$ conc. (mg/l) | $O_2$ conc. (mg/l) |
|---|---|---|---|---|
| R1-4 | (May 21) | 5.0 | — | — |
| R5 | (May 21) | — | — | 8.0 |
| R1 | (June 13) | 5.0 | — | — |
| R2 | (June 13) | 5.0 | 0.1 | — |
| R3 | (June 13) | 5.0 | 1.0 | — |
| R4 | (June 13) | 5.0 | 10.0 | — |
| R5 | (June 13) | — | 1.0 | 8.0 |

Example 6b

For all reactors, the primary acceptor was completely reduced within 5 days. Perchlorate was reduced completely (R2 and R5) or by about 60% (R3 and R4) within 2 weeks of its addition. Activity tests were carried out to explore the ecology of the MBfRs. Reactors 1, 2, and 4 were challenged with a medium containing 10,000-μg/L perchlorate and 5-mg/L nitrate. The average removals at the end of the tests are plotted in FIG. 10. R3 and R5 were not operating at the time. These results show a higher perchlorate-reducing activity in the reactors that had higher influent perchlorate, suggesting enrichment for perchlorate-reducing bacteria. Further studies of the microbial community using Denaturing Gradient Gel Electrophoresis (DGGE) suggest an increasing abundance of a perchlorate-reducing isolate for the reactors with increasing influent perchlorate concentrations. Tests using Fluorescent In-Situ Hybridization to quantify bacteria matching the above DGGE band confirm its enrichment with higher influent perchlorate concentrations.

Example 7

Another reactor was tested for removal of several other oxidized drinking water contaminants. In all tests, the influent included 5-mg/L nitrate or 8 mg/L $O_2$ as a primary electron accepting substrates, plus an oxidized contaminant, i.e., "compound" in Table 4. The reactor was seeded with a mixed culture of autotrophic, denitrifying bacteria from a previous denitrification study and was operated at a pH of 7 and a 25-minute hydraulic detention time. A high recirculation rate was used to simulate mixed or stirred conditions. The experiments for all contaminants lasted 10 hydraulic detention times. No attempt was made to optimize contaminant reduction; an objective was simply to demonstrate reduction by a denitrifying or oxygen-reducing mixed culture. The results are summarized in Table 4. In all the tests, over 99 percent of the nitrate and oxygen was reduced.

TABLE 4

| | | Removal Efficiency (%) | |
|---|---|---|---|
| Compound | Probable Reduction Reaction(s) | $O_2$ Reactor | $NO_3^-$ Reactor |
| Arsenate | $H_2AsO_4^- + H_2 + H^+ \rightarrow H_3AsO_3 + H_2O$ | >50 | >50 |
| Bromate | $BrO_3^- + 3H_2 \rightarrow Br^- + 3H_2O$ | >95 | >95 |
| Chlorate | $ClO_3^- + 3H_2 \rightarrow Cl^- + 3H_2O$ | >95 | 29 |
| Chlorite | $ClO_2^- + 2H_2 \rightarrow Cl^- + 2H_2O$ | >75 | 67 |
| Chromate | $HCrO_4^- + 1.5H_2 + 2H^+ \rightarrow Cr(OH)_3 + H_2O$ | >75 | >75 |
| Dichloro-methane | $CH_2Cl_2 + 2H_2 \rightarrow CH_4 + 2H^+\, 2Cl^-$ | 38 | 45 |
| Nitrate | $NO_3^- + 2.5H_2 + H^+ \rightarrow 0.5N_2 + 3H_2O$ | Not tested | >99 |
| Perchlorate | $ClO_4^- + 4H_2 \rightarrow Cl^- + 4H_2O$ | >98 | 36 |
| Selenate | $SeO_4^{2-} + 3H_2 + 2H^+ \rightarrow Se° + 4H_2O$ $SeO_4^{2-} + 2H_2 + H^+ \rightarrow HSeO_3^- + H_2O$ | 67 | 74 |
| Selenite | $HSeO_3^- + 2H_2 + H^+ \rightarrow Se° + 3H_2O$ | 93 | 57 |

The results show the chlorate and chlorite contaminants are reduced under denitrifying and oxygen reducing conditions—consistent and in accordance with the results obtained with perchlorate. Likewise and without limitation, various other contaminants (e.g., bromate, selenate, selenite, nitrite, etc.) were also reduced and removed, as shown in Table 4. With greater acclimation times, lower input concentrations and/or reactor optimization, higher efficiencies can be obtained.

Example 8

Preliminary studies were carried out on wastewater denitrification with an MBfR apparatus in accordance with FIG. 2A. An open matrix or spatial arrangement defined by the membrane configuration allows mixed liquor to move between the membrane fibers without being filtered out or fouling the membrane surface. The influent contained the effluent from the first-stage of the multiple-stage pre-denitrification plant in New York City. The influent to the MBfR had a $NO_3^-$ concentration of about 10-about 20 mgN/L. The flow rate was 2.3 L/d, giving an empty-bed hydraulic retention time of 3 h. No inoculum was provided before feeding the wastewater to the MBfR.

Denitrification in the MBfR started immediately and achieved a high level of denitrification within a few days. Effluent $NO_3^-$ was driven to below about 1 mgN/L, and $H_2$ pressure gave sensitive control of the denitrification capacity. For example, when the $H_2$ pressure was only 2 psi (0.14 atm) and influent $NO_3^-$ was 13 mgN/L, the effluent $NO_3^-$ was 0.85 mgN/L, giving a $NO_3^-$ flux of 1.4 $gN/m^2$-d. Increasing the $H_2$ pressure to 5 psi (0.34 atm) when the influent $NO_3^-$ was 16.4 mgN/L gave effluent $NO_3^-$ of only 0.4 mgN/L, with a $NO_3^-$ flux of 1.8 $gN/m^2$-d.

Despite the open-matrix configuration, extended operation without sufficient mixing and turbulence can lead to excess biofilm or suspended-solids accumulation, causing some membrane fibers to clump together with reduction of biofilm surface area and the mass-transport rate to the biofilm. For example, a $H_2$ pressure of 5 psi (0.34 atm) gave a nominal $NO_3^-$ flux of 1 $gN/m^2$-d and had effluent $NO_3^-$ and $NO_2^-$ concentrations of 3.6 and 1.6 mgN/L, respectively, after clumping.

An $H_2$-based MBfR has been proven for the reduction of nitrate and perchlorate and other oxidized contaminants in drinking water and groundwater settings. However, in light of this invention, use of hydrogen as an electron donor may have most extensive application for advanced nitrogen removal in wastewater treatment, where existing approaches fail to achieve the goals of advanced-N removal; have severe problems of cost, reliability, and safety; or both. By utilizing $H_2$ gas as the electron donor to drive denitrification, an MBfR of this invention and related methods completely eliminate an added organic electron donor, which overcomes major problems: a large increase in excess biomass generation, over- or under-dosing of donor, safety concerns, and relying on specialized methanotrophs. In addition, such an apparatus simple to operate, and it can be used for tertiary denitrification or integrated into a pre-denitrification process. Preliminary results show that autotrophic denitrifiers accumulate rapidly in the wastewater setting, the MBfR can drive $NO_3^-$ concentrations below 1 mgN/L, and the $H_2$ pressure controls the $NO_3^-$ flux.

With reference to the preceding, a range of other oxidized contaminants can be reduced and/or removed from an aqueous medium, such contaminants including but not limited to oxidized species of uranium, neptunium, sulfur, cadmium, and nickel, as well as other halogenated hydrocarbon compounds. Such contaminants can be treated/removed as would be understood by those skilled in the art made aware of this invention using the procedures described herein for straightforward modifications thereof, such modifications as would also be known to such individuals without undue experimentation.

We claim:
1. An apparatus, comprising:
a support grid having a plurality of openings through the grid;
a plurality of oxygen permeable hollow fiber membrane components, each said membrane component having a first end, a second end, and a passage; wherein the first ends of at least a portion of the plurality of membrane components extend through at least one support grid opening; and an inlet component for said plurality of membrane components.

2. The apparatus of claim 1 wherein each hollow fiber membrane is sealed at one end.

3. The apparatus of claim 1 wherein said inlet component comprises a manifold.

4. The apparatus of claim 2 wherein said membrane components are positioned in a row configuration.

5. The apparatus of claim 4 wherein said membrane components are positioned in a configuration of rows and columns.

6. The apparatus of claim 1 wherein each membrane component comprises a substantially non-porous member.

7. The apparatus of claim 6 wherein each said membrane component comprises inner and outer layers having a first density and a layer therebetween having a second density greater than said first density.

8. The apparatus of claim 7 wherein said layer between said inner and outer layers is substantially non-porous.

9. The apparatus of claim 1 in a container.

10. The apparatus of claim 9 wherein said container is an activated sludge tank.

11. A method for treating a wastewater system comprising solid particles, the method comprising:
providing an apparatus according to claim 1.

12. The method of claim 11, further comprising contacting the apparatus with oxygen gas.

13. An apparatus, comprising:
a support grid having a plurality of openings through the grid;
a plurality of hydrogen permeable hollow fiber membrane components, each said membrane component having a first end, a second end, and a passage; wherein the first ends of at least a portion of the plurality of membrane components extend through at least one support grid opening; and
an inlet component for a plurality of membrane components.

14. The apparatus of claim 13 wherein each hollow fiber membrane is sealed at one end.

15. The apparatus of claim 13 wherein said inlet component comprises a manifold.

16. The apparatus of claim 14 wherein said membrane components are positioned in a row configuration.

17. The apparatus of claim 16 wherein said membrane components are positioned in a configuration of rows and columns.

18. The apparatus of claim 13 wherein each membrane component comprises a substantially non-porous member.

19. The apparatus of claim 13 in a container.

20. The apparatus of claim 19 wherein said container is an activated sludge tank.

\* \* \* \* \*

UNITED STATES PATENT AND TRADEMARK OFFICE
CERTIFICATE OF CORRECTION

| | | |
|---|---|---|
| PATENT NO. | : 7,910,009 B1 | |
| APPLICATION NO. | : 12/638642 | |
| DATED | : March 22, 2011 | |
| INVENTOR(S) | : Bruce E. Rittmann, Robert Nerenberg and César I. Torres | |

Page 1 of 1

It is certified that error appears in the above-identified patent and that said Letters Patent is hereby corrected as shown below:

Column 12, Line 33:

"low to moderate $NO_3$" surface loading" should read --low to moderate $NO_3^-$ surface loading--.

Signed and Sealed this
Fifteenth Day of November, 2011

David J. Kappos
*Director of the United States Patent and Trademark Office*